Patented Feb. 10, 1925.

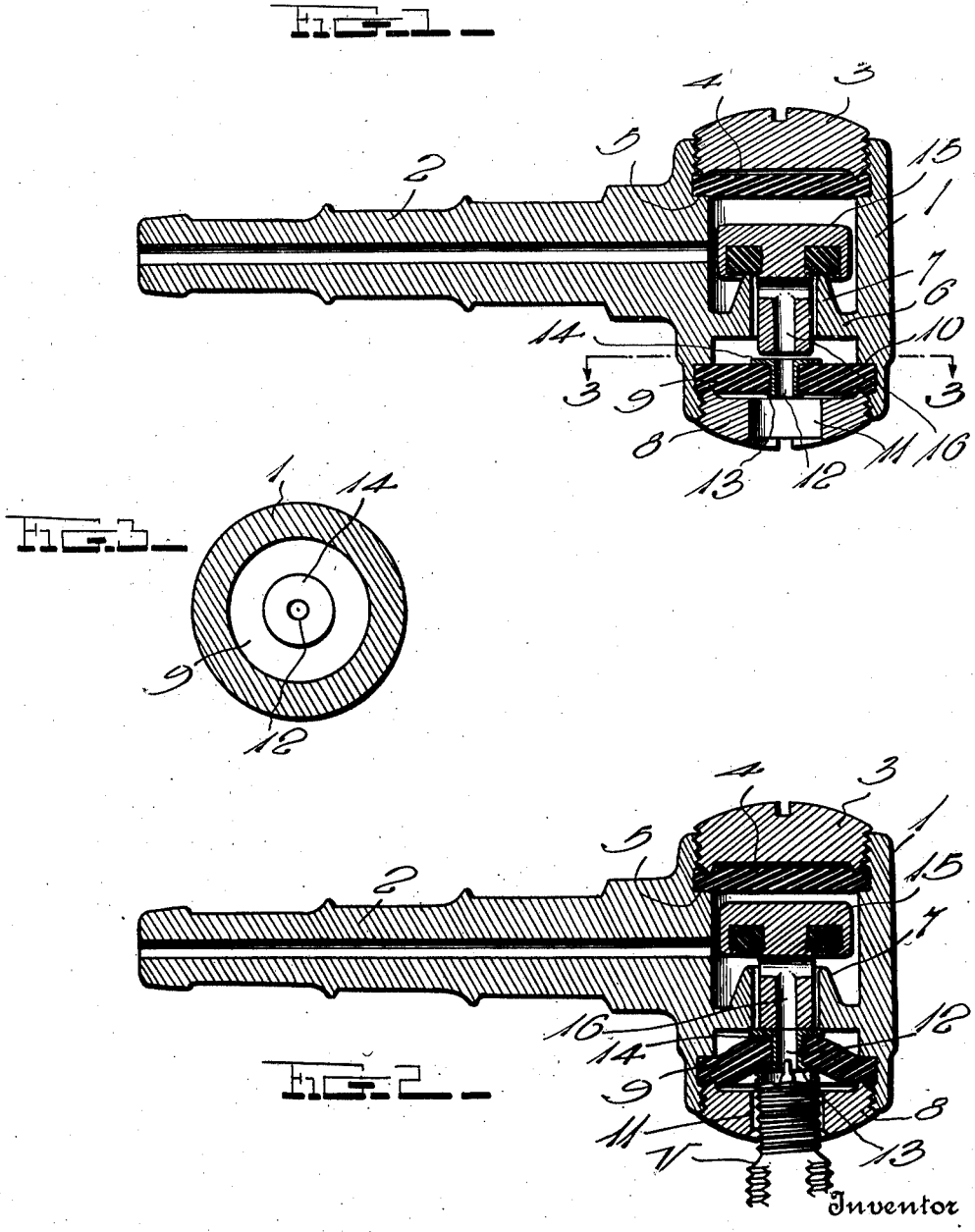

1,526,271

UNITED STATES PATENT OFFICE.

ARNO ARTHUR EWALD, OF OAKFIELD, WISCONSIN.

TIRE-INFLATION VALVE.

Application filed November 25, 1922. Serial No. 603,283.

*To all whom it may concern:*

Be it known that I, ARNO A. EWALD, a citizen of the United States, residing at Oakfield, in the county of Fond du Lac and State of Wisconsin, have invented certain new and useful Improvements in Tire-Inflation Valves; and I do declare the following to be a full, clear, and exact description of the invention, such as will enable others skilled in the art to which it appertains to make and use the same.

My invention relates to improvements in hose-carried tire inflation devices, in which axial inward yielding of a tire-valve-engaging gasket, by application of the device to such a valve, produces opening of a cut-off valve within the inflation device, to permit the outrush of air to inflate the tire.

One object of the invention is to provide a gasket whose outer side is equipped with a centering device carried totally by the gasket and relatively immovable with respect thereto, said centering device being receivable in the outer end of an ordinary tire valve, so as to properly position the inflation device and tire valve relatively and insure that only the smooth outer end of the tire valve, shall contact with the gasket.

Another object is to construct the above-named centering device, in the form of a short tube immovably held within the opening of the gasket, the inner end of said tube being adapted to strike a portion of the valve and operate the latter, and in this connection, a further aim is to provide an internal stop surface in the inflation device, adapted to be struck by the inner end of said short tube, to limit the relative movement of the gasket and the remainder of the inflation device, establishing a positive connection between the two, so that manual pressure upon the head of said device, will tightly hold the gasket against the end of the tire valve.

Another object is to provide a structure in which replacement of a tire-valve-engaging gasket, will simultaneously produce replacement of the centering device or short tube.

With the foregoing in view, the invention resides in the novel subject matter hereinafter described and claimed, the description being supplemented by the accompanying drawings.

Figure 1 is a longitudinal sectional view through an inflation valve constructed in accordance with my invention, showing the same closed.

Figure 2 is a duplicate of Fig. 1 with the exception that it illustrates the valve in open position and applied to a tire valve.

Figure 3 is a horizontal sectional view as indicated by line 3—3 of Fig. 1.

In the construction herein disclosed, the numeral 1 designates a hollow cylindrical head having an integral neck 2 of any desired form for attaching said head to an air hose. One end of the head 1 is closed by a threaded plug 3, a suitable gasket 4 being provided between the inner end of said plug and a shoulder 5 in the head, for the purpose of preventing leakage. The bore of the neck 2 opens into the head 1 between the plug 3 and a transverse valve seat or partition 6 which extends across said head, said partition having a central aperture and a valve seat proper 7 around the same. The end of the head 1 opposite the plug 3, is closed by a second plug 8 which clamps a second gasket 9 against an internal shoulder 10 in said body, said plug 8 being formed with an aperture 11 of a size to receive the threaded end of an ordinary tire valve V, as seen in Fig. 2, whereby to permit the smooth end wall of said valve V, to come in contact with the outer flat face of the gasket 9. The opening in this gasket is of insufficient size to permit the threads at the outer end of the valve V to enter said opening and in the present showing, this opening snugly receives a tube 12 of metal or other wear-resisting material. The outer end of the tube 12 protrudes slightly beyond the outer flat face of the gasket 9 and is preferably turned outwardly in the form of a flange, as indicated at 13, constituting a rib around the wall of the gasket opening, said rib being adapted for reception in the outer end of a tire valve as seen in Fig. 2, thereby relatively positioning the gasket 9 and said valve, so that the latter will properly receive air passing through the tube 12. The inner end of the tube 12 is formed with a wider flange 14 contacting with the inner surface of the gasket 9 and it will be seen that the two flanges co-act in holding the tube within the gasket opening.

A suitable valve 15 is provided for co-operation with the valve seat 7 to normally prevent the passage of air through the head 1, said valve having a tubular air escape stem 16 which passes through the central opening of the partition 6, in the inward path of the tube 12. It thus follows that when the device is applied to a tire valve with pressure, the gasket 9 yields inwardly as shown in Fig. 2, thereby forcing upon the stem 16 and effecting opening of the valve 15. Air thus passes through the head 1, the stem 16 and the tube 12, into the tire valve V. Attention may here be directed to the fact that when the device is applied in this manner to a tire valve, relative movement of the head 1 and the gasket 9, is prevented by the fact that the flange 14 strikes the partition 6. Thus, pressure upon the head will compress the gasket 9 and hold it tightly against the end of the valve V.

By employing the construction shown, or a substantial equivalent thereof, a device is provided in which the gasket at the open end of the valve, has a life greatly exceeding that of the gaskets now commonly used. Whereas the usual gaskets in every day use are badly worn after they have been applied to and removed from tire valves, approximately five hundred times, an inflation valve constructed in accordance with the present invention has been successfully used without leakage for one hundred and ten thousand applications, which is due principally to the fact that the threads of the tire valve cannot engage the wall of the gasket opening to mutilate the same, contact of one flat side of the gasket upon the smooth end wall of the tire valve, being relied upon to form a tight seal between the hose carried valve and the tire valve, as will be seen from Fig. 2.

I prefer to employ the details disclosed, on account of their proven merits, but within the scope of the invention as claimed, numerous changes may be made, and obviously, the gasket and its tire-valve-engaging, centering device, may be used with inflation devices of other than the particular form shown. In any case, a new centering device is bodily insertible with a new gasket.

I claim:

1. In a hose-carried tire inflating device having a head, an axially elastic tire-valve-engaging gasket marginally secured to said head and having an opening of insufficient size to receive the end of a tire valve, and a pressure cut-off valve in the head opened by inward axial yielding of said gasket; a centering device carried solely by and movable bodily with said gasket, said centering device being disposed adjacent the wall of the gasket opening for reception in the end of a tire valve to relatively center the latter and the gasket, said gasket having limited inward yielding whereby manual pressure on said head will positively hold the gasket against the tire valve.

2. A tire inflating device comprising a hollow head having a closed end, a pressure inlet adjacent said end, and a valve seat spaced between said pressure inlet and the other end of said head, an axially elastic tire valve-engaging gasket marginally secured to said other end of said head and having a central opening of insufficient size to receive the end of a tire valve, a normally closed cut-off valve coacting with said valve seat and having a tubular pressure discharge stem extending to a point adjacent the inner side of the gasket to be moved by inward yielding of said gasket, and a centering device carried solely by and movable bodily with said gasket, said centering device being disposed adjacent the wall of the gasket opening for reception in the end of a tire valve to relatively center the latter and the gasket, said gasket having limited inward movement, whereby manual pressure upon said head will hold said gasket in tight contact with the tire valve.

3. A structure as specified in claim 1; said centering device comprising a short tube in the gasket opening and immovable with respect to the gasket, the inner end of said tube being disposed to strike a portion of said cut-off valve upon inward yielding of the gasket, the outer end of said tube being extended slightly beyond the outer side of the gasket for reception in the end of a tire valve.

4. A structure as specified in claim 1; said centering device comprising a short tube in the gasket opening and immovable with respect to the gasket, the inner end of said tube being disposed to strike a portion of said cut-off valve upon inward yielding of the gasket, the outer end of said tube being extended slightly beyond the outer side of the gasket for reception in the end of a tire valve, the inner and outer ends of said short tube having outstanding flanges tightly holding said gasket between them.

5. A structure as specified in claim 1; said centering device comprising a short tube in the gasket opening and immovable with respect to the gasket, the inner end of said tube being disposed to strike a portion of said cut-off valve upon inward yielding of the gasket, the outer end of said tube being extended slightly beyond the outer side of the gasket for reception in the end of a tire valve, said head having an internal stop in the inward path of said short tube to produce said limited inward movement of said gasket.

6. In a hose-carried tire inflating device having a head, an axially elastic tire-valve-engaging gasket marginally secured to said head and having an opening of insufficient size to receive the end of a tire valve, and a pressure cut-off valve in the head opened by inward axial yielding of said gasket; a short tube snugly received in the opening of and movable bodily with said gasket, said tube protruding slightly beyond the outer side of the gasket for reception in the end of a tire valve, the inner end of said short tube having an outstanding annular flange constantly lying on said gasket and adapted to strike and force said valve inwardly when the gasket inwardly yields upon application to a tire valve, said flange being of greater diameter than the portion of the valve adjacent the gasket and being adapted to strike an internal portion of said head to limit the inward movement of the gasket, whereby manual pressure on said head will tightly hold said gasket against the tire valve.

7. An axially elastic replacement gasket for a hose-carried inflation valve, said gasket having an opening of insufficient size to receive the threaded end of a tire valve, whereby the valve must contact solely with one flat side of said gasket, the latter being provided at said flat side with a centering device adjacent the wall of its opening for reception in the end of a tire valve to properly position the latter, said centering device and gasket being relatively immovable.

8. An axially elastic replacement gasket for hose-carried inflation valves, said gasket having an opening of insufficient size to receive the threaded end of a tire valve, whereby the latter must contact solely with one flat side of the gasket, and a wear-resisting tube immovably held in the gasket opening and carried totally by said gasket, said tube protruding from said one side of said gasket, said protruding tube end being adapted for reception in the end of a tire valve to properly position the latter.

9. A structure as specified in claim 8; said tube having outstanding flanges on its ends snugly holding said gasket therebetween.

10. A structure as specified in claim 8; said tube having a wide outstanding flange lying on one side of said gasket.

In testimony whereof I have hereunto affixed my signature.

ARNO ARTHUR EWALD.